(12) United States Patent
Fricke (10) Patent No.: US 7,654,032 B1
(45) Date of Patent: Feb. 2, 2010

(54) ADJUSTABLE QUICK RIG

(76) Inventor: Charles Fricke, 22923 Dirk La., Cudjoe Key, FL (US) 33041

( * ) Notice: Subject to any disclaimer, the term of this patent is extended or adjusted under 35 U.S.C. 154(b) by 128 days.

(21) Appl. No.: 11/832,632

(22) Filed: Aug. 1, 2007

(51) Int. Cl.
*A01K 83/06* (2006.01)
(52) U.S. Cl. ...................................... 43/44.2; 43/44.91
(58) Field of Classification Search ............... 43/44.2, 43/44.4, 44.6, 44.8, 44.9, 44.91
See application file for complete search history.

(56) References Cited

U.S. PATENT DOCUMENTS

| | | | | |
|---|---|---|---|---|
| 2,254,800 A | * | 9/1941 | Furdas | 43/43.11 |
| 2,654,177 A | * | 10/1953 | Cope et al. | 43/44.88 |
| 4,932,154 A | | 6/1990 | Andretti | |
| 4,964,234 A | * | 10/1990 | Davey | 43/44.2 |
| 5,456,041 A | * | 10/1995 | Schoeberlein | 43/44.91 |
| 5,533,296 A | * | 7/1996 | Jansen | 43/42.36 |
| 6,658,785 B1 | * | 12/2003 | Faulkner et al. | 43/44.2 |
| 6,698,133 B1 | * | 3/2004 | Fricke | 43/44.2 |
| 6,708,442 B2 | * | 3/2004 | Kress et al. | 43/44.4 |
| 2005/0072038 A1 | | 4/2005 | Daley | |

* cited by examiner

*Primary Examiner*—Kurt Rowan (57) ABSTRACT

An adjustable quick rig for a bait comprising a bait pin to hold the bait, a leader channel having a tapered passage to receive a leader, and a line stopper intended for crimping onto the leader at an adjustable location to set a desired length of the leader relative to a hook in the bait. The line stopper can jam within a portion of the tapered passage to provide the desired length. The adjustable quick rig can transfer a pulling force from a back of the bait to a front of the bait to suppress a spinning motion during trolling. Moreover, the adjustable quick rig can use one leader to accommodate a variety of bait fish of different lengths.

10 Claims, 4 Drawing Sheets

ADJUSTABLE QUICK RIG

FIELD OF THE INVENTION

The present invention relates to an adjustable pin rig and method for rigging a bait. More specifically, the present invention is directed to an adjustable pin rig and a method for rigging a bait which imparts a natural "swimming" motion to the bait while it is being trolled, allowing a rigging of the bait with one or more hooks to be selectably positioned along the body of the bait which is natural in appearance, and further, which is inexpensive to manufacture.

BACKGROUND

Fishermen often use dead bait which is frozen to facilitate storage and subsequent handling. A number of devices have been developed to attach or rig a hook to dead bait. A number of factors must be considered in the design of such devices, with the goal of maximizing the possibility of attracting and catching a targeted species of fish.

A primary concern with dead bait is to rig the bait in such a manner that the bait simulates a natural "swimming" motion as it is trolled behind a vessel, a common practice in sport fishing. In addition, the ability to rig bait to accommodate the various strike habits of various target species of fish is highly desirable. A further concern when rigging dead bait for fishing is to attach the bait in a manner that does not detract from the natural appearance of the bait, such that the rig is unobtrusive when it is presented to the target species of fish.

When a pin rig is secured through the mouth of the bait, it pins the mouth of the bait closed while it is trolled. This helps prevent water from being forced into the bait, distorting the natural "swimming" motion. This also limits degradation of the bait which might result from the force of water flowing through. However, if the bait is pulled from a hook at an end of the bait, the bait will spin and be unacceptable to the target game fish.

A number of devices have been developed to quickly secure a pin rig to a bait. Specifically, hood type devices have been developed which reduce the time required to perform this operation. Many of these devices are structured to enclose a portion of the leader while engaging the section of the pin which extends upward through the snout of the bait.

One drawback to these devices is that they do not facilitate positioning a hook near the rear of the bait, as the pin rigs are typically attached to the front end of the bait, and to the end of the leader where the hook is attached. A further disadvantage of these hood devices is that they detract significantly from the natural appearance of the bait presented to the target species of fish, thereby reducing the likelihood of a strike and subsequent catch.

One attempt to overcome the aforementioned problems is a hood-like device. This device comprises a multi-sectioned plastic hood which is secured over the head of a bait. The device comprises a first section having a post which is inserted through one side of the bait, such as through the eyes, and a second section having a seat designed to securely receive the post, thus securing the device to the bait. Such a rig may also include a bead chain for attaching the hook. However, the bead chain is a weak link between the leader and the hook, and introduces potential for losing a target fish. For instance, the chain can break even after the hook has been set.

Another rig, which eliminates the use of a pin, comprises a leader having a swivel at one end and a loop structured to accept a first hook at the other end. A second hook is attached to the leader and can be positioned along the leader between the swivel and the first hook.

A previous patent by the instant inventor, U.S. Pat. No. 6,698,133 B1 Fricke, teaches a method for rigging bait to a pin support having modes, that alternatively requires use of a multi-purpose rigging tool.

SUMMARY OF THE INVENTION

It would be beneficial to provide a pin rig and method for rigging a bait which allows one or more hooks to be adjustably positioned between the front and rear of a bait. Additionally, it would be helpful for any such adjustable pin rig to be quickly and easily attached and detached from a bait. Further, any such adjustable pin rig and method for rigging a bait would preferably aid in imparting a natural "swimming" motion to the bait. In addition, it would be best for a rig to be unobtrusive to the target species of fish and, of course, it would be preferable for any such adjustable pin rig to be inexpensive to manufacture so that it would be readily available to all fishermen.

The present invention is directed to an adjustable pin rig and method of rigging a bait and addresses these and other needs which remain in the art. The adjustable pin rig can include, at least one pin, although in another embodiment, the invention can comprise a plurality of pins. A second pin, when used, can serve to secure the bait more firmly, especially when rigging multiple baits without hooks on a teaser (commonly used to attract fish to trolled baits that do have hooks).

A pin support can be provided to which at least a portion of each pin is interconnected. Each pin further can comprise a free end which is structured to extend outwardly from the pin support, and can be further structured to pierce a portion of the bait. In one embodiment, the free end of each pin can be configured to extend upwardly from an upper surface of the pin support so as to allow one pin to pierce the bait from the underside through the top, the second pin can be embedded into the bony head structure of the bait.

These and other objects, features and advantages of the herein taught technology will become clearer when the drawings and detailed description are taken into consideration.

BRIEF DESCRIPTIONS OF DRAWINGS

List of Figures and Item Numbers

List reference numerals refer to like parts throughout the several views of the drawings.

Figure 1:
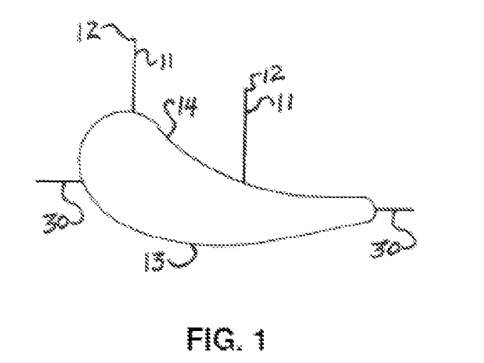
FIG. 1 is a side view of the adjustable pin rig according to an embodiment of the present invention.
Figure 1A:
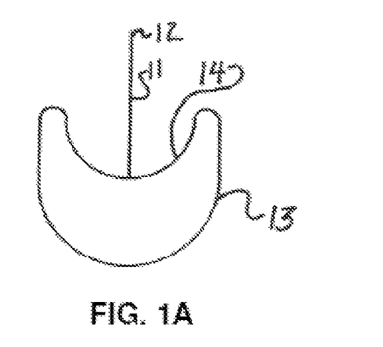
FIG. 1A is a front view of the adjustable pin rig as depicted in the FIG. 1 according to an embodiment of the present invention.
Figure 2:
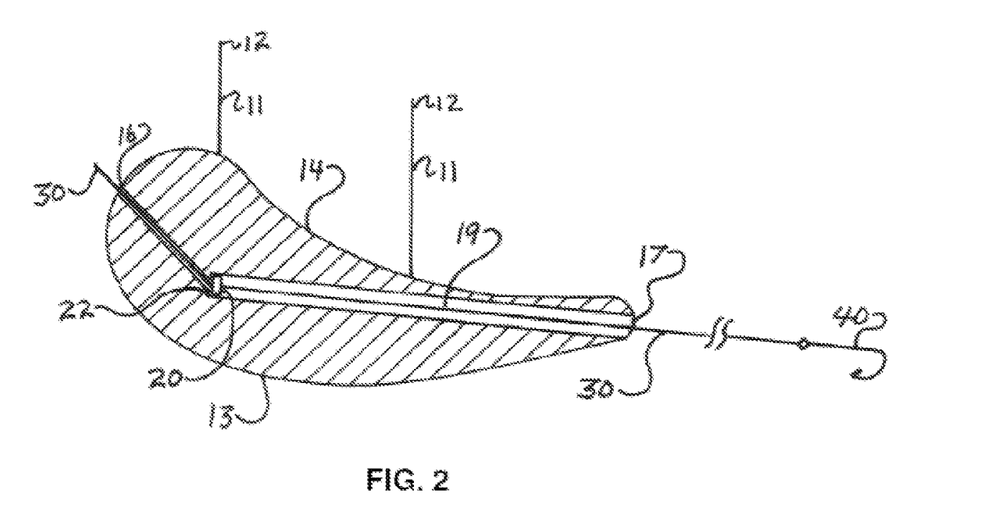
FIG. 2 is a cross section of the adjustable pin rig as depicted in the FIG. 1 with a line stopper jammed inside the leader channel according to an embodiment of the present invention.
Figure 2A:
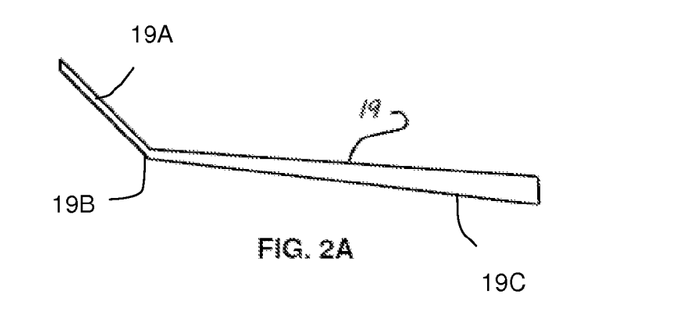
FIG. 2A is a depiction of a tapered leader channel according to an embodiment of the present invention.
Figure 3:
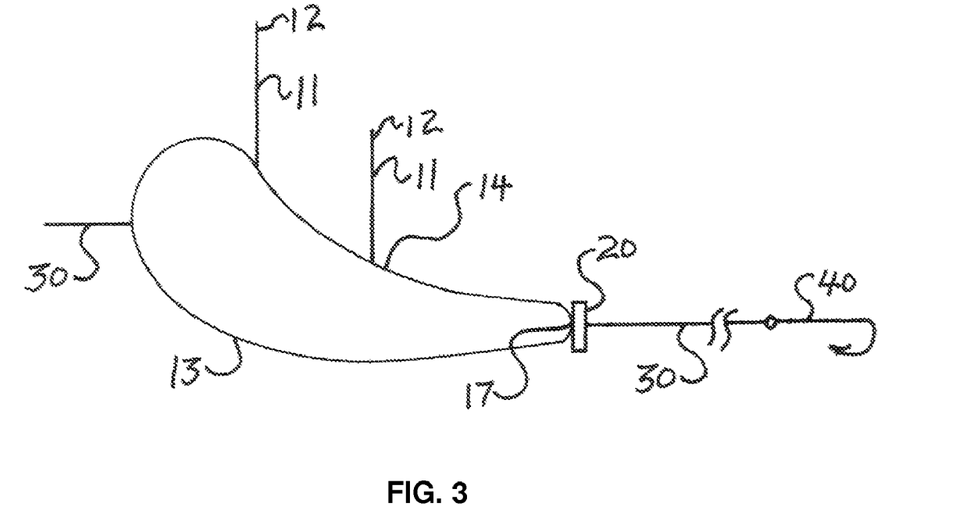
FIG. 3 is a side view of the adjustable pin rig with a line stopper jammed outside the leader channel according to an embodiment of the present invention.
Figures 3A, 4:
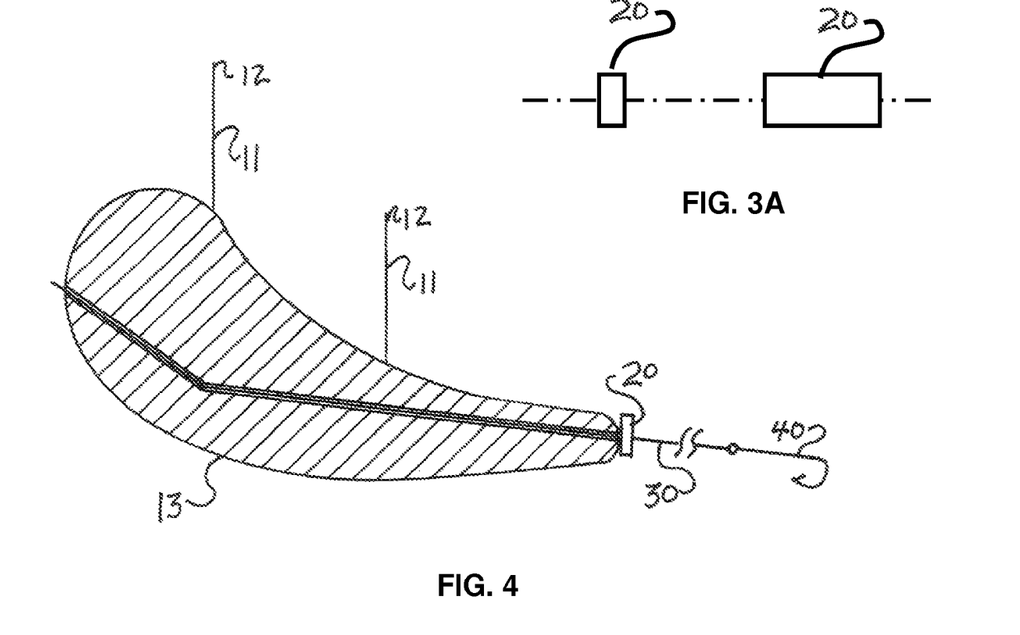
FIG. 3A depicts a line stopper of a first size and a second size according to an embodiment of the present invention.
FIG. 4 is a cross section of the adjustable pin rig as configured in FIG. 3 according to an embodiment of the present invention.
Figure 5:
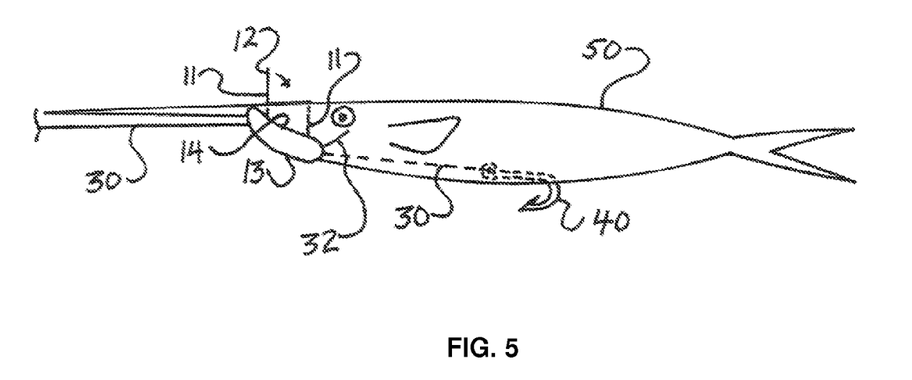
FIG. 5 is a side view of the adjustable pin rig with bait in place and the hook positioned near the center of the bait according to an embodiment of the present invention.
Figure 6:
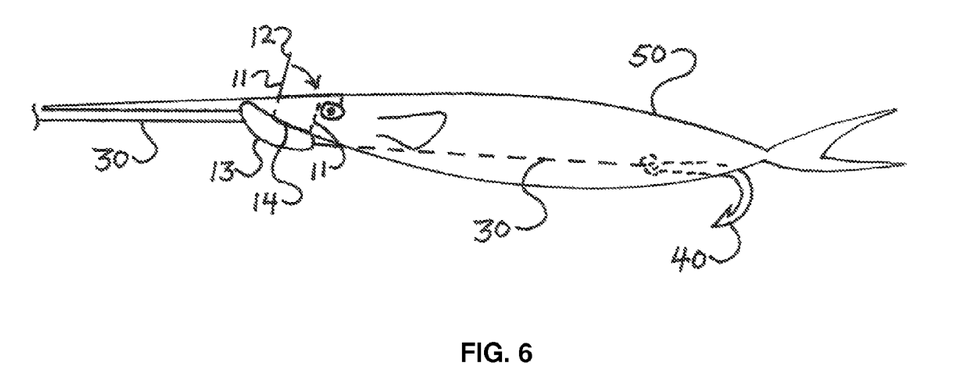
FIG. 6 is a side view of bait with the adjustable pin rig with bait in place and the hook positioned near the tail of the bait according to an embodiment of the present invention.
Figure 7:
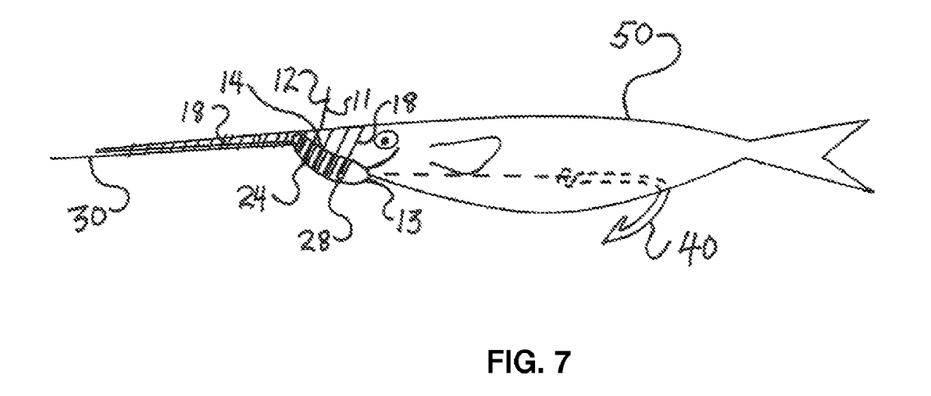
FIG. 7 is a side view of bait rigged with a wire wrapped around the bait and the adjustable pin rig to more firmly secure them together according to an embodiment of the present invention.
Figure 8:
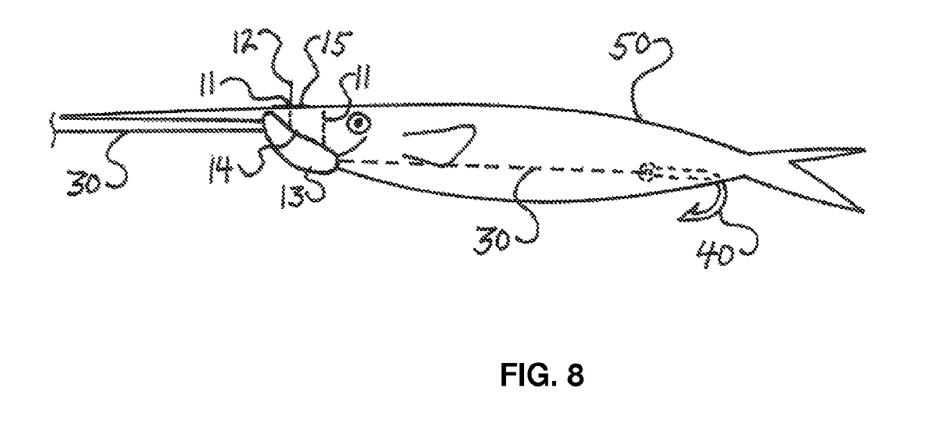
FIG. 8 is a side view of bait with adjustable pin rig having a bait pin fastener attached to a bait pin according to an embodiment of the present invention.

FIG. 1
11 bait pin
12 free end of pin
13 pin support
14 upper surface of pin support
30 leader
FIG. 1A
11 bait pin
12 free end of pin
13 pin support
14 upper surface of pin support
FIG. 2
11 bait pin
12 free end of pin
13 pin support
14 upper surface of pin support
16 leading end orifice
17 trailing end orifice
19 leader channel
20 line stopper
22 trailing end
30 leader
40 hook
FIG. 2A
19 leader channel
FIG. 3
11 bait pin
12 free end of pin
13 pin support
14 upper surface of pin support
17 trailing end orifice
20 line stopper
30 leader
40 hook
FIG. 3A
20 line stopper
FIG. 4
11 bait pin
12 free end of pin
13 pin support
20 line stopper
30 leader
40 hook
FIG. 5
11 bait pin
12 free end of pin
13 pin support
14 upper surface of pin support
30 leader
32 gills
40 hook
50 bait
FIG. 6
11 bait pin
12 free end of pin
13 pin support
14 upper surface of pin support
30 leader
40 hook
50 bait
FIG. 7
11 bait pin
12 free end of pin
13 pin support
14 upper surface of pin support
18 wire wrap
24 groove
28 hole
30 leader
40 hook
50 bait
FIG. 8
11 bait pin
12 free end of pin
13 pin support
14 upper surface of pin support
15 pin fastener
30 leader
40 hook
50 bait

DETAILED DESCRIPTION OF THE PREFERRED EMBODIMENT

While this invention is susceptible of embodiment in many different forms, there is shown in the drawings and will herein be described in detail at least one specific embodiment, with the understanding that the present disclosure is to be considered as an exemplification of the principles of the invention and is not intended to limit the invention to the embodiment illustrated.

One embodiment can provide an adjustable quick rig that can include a pin support comprising a material heavier than water, wherein at least a portion of a bait pin is attached to the pin support. The bait pin can have a free end structured so as to allow it to pierce through a portion of the bait. A top surface of the pin holder can include an open-topped channel contoured to conform to the ventral surface of the associated bait, when rigged proximal to the bait.

The pin support can include a leader channel. The leader channel can include 1) a trailing end orifice traversing an anterior portion of the pin support to receive the leader, 2) a leading end orifice traversing a posterior portion of the pin support to pass the leader, wherein the trailing end orifice connects to the leading end orifice to create a stopping junction at a trailing end due to a difference in size of trailing end orifice and the leading end orifice, and 3) a line stopper intended for crimping to the leader at an adjustable length, wherein the line stopper jams against the stopping junction to establish a location that a hook attached to an end of the leader assumes relative to the bait.

When a leading end of the leader is slid through the leader channel entering at the trailing end orifice of the leader channel and emerging at the leading end orifice, the line stopper contacts and jams against the stopper junction internal to the pin support thereby transferring a pulling force from the hook at a posterior end of the bait, instead, to the anterior portion of the pin support corresponding to an anterior end of the bait to suppress a spinning motion of the bait.

The herein taught device comprises an adjustable bait rig for fishing. Referring to FIG. 1, FIG. 2, FIG. 3, FIG. 4, and FIG. 5, the rig includes a pin support 13 on which at least one pin 11 is mounted, a leader 30 and a line stopper 20.

Referring to FIG. 1, the pin 11 is preferably constructed of rigid material, such as, by way of example only, metal or non-deformable plastic. It has a free end 12 by which it penetrates the bait 50, thus holding it, and the pin support 13, in position on the bait 50. In a preferred embodiment, the pin 11 is of sufficient length that the free end 12, after piercing the bait fish, extends above the dorsal side of the bait fish.

The pin 11 is further structured such that at least a portion of it may be snipped short once the pin support 13 is secured to the bait, in order that the pin 11 is unobtrusive to the fish being angled. In another embodiment, as in FIG. 5, the free end 12 of the pin 11 may be bent so that it lies contiguous to the dorsal side of the bait fish. Furthermore, as in FIG. 6, a portion of said free end 12 of said pin 11 lying contiguous to the dorsal side of the bait fish may be embedded in the dorsal side of the bait fish. In at least one embodiment of the present invention, the adjustable bait rig comprises a plurality of pins 11, as illustrated in FIG. 1, FIG. 2, FIG. 3, FIG. 4, FIG. 5, FIG. 6, FIG. 7, and FIG. 8.

The pin support 13 may comprise any one or more synthetic materials such as plastics which may impart buoyant properties to the rig. In one preferred embodiment, the pin support 13 comprises lead, however, it is within the scope of the present invention to utilize other malleable materials, including synthetics. The pin support 13 comprises an upper surface 14 which is structured to be disposed adjacent to the bait 50, preferably along the underside (generally termed ventral side) and adjacent to the front (anterior) of the bait 50. In addition, the upper surface 14 is concave, as in FIG. 1A, and further contoured, as in FIG. 1, FIG. 2, FIG. 3, FIG. 4, FIG. 5, FIG. 6, FIG. 7, and FIG. 8, such that it both conforms to the underside of the bait fish and serves to hold the bait fish's gills 32 closed thus eliminating the need to sew said gills shut. This both allows the device an unobtrusive appearance when disposed in an operative fashion adjacent to the bait 50 and accomplishes a hydrodynamic configuration for the bait rig which causes it to travel through the water in a natural "swimming" motion in the manner of a live, free-swimming game fish prey.

The pin 11 may be attached to the pin support 13 by any well known means including but not limited to welding, soldering, adhesives, or by mechanical fasteners such as nails or screws. In one preferred embodiment, the portion of the pin 11 which is mounted on the pin support 13 is positioned in a mold into which molten lead is added and allowed to cool and harden, thereby securing the pin 11 to the pin support 13.

The adjustable quick rig in one embodiment comprises at least one fastener. More specifically, such fastener can be structured to at least partially secure the adjustable quick rig to the bait. The pin support can be structured to be adjustably positionable along at least a portion of a leader to which one or more hooks are attached. Further, the pin support includes an attachment mechanism which can be structured to secure the adjustable quick rig to at least a portion of the leader, which can be disposed adjacent to the front (generally the anterior ventral surface) along the inside of the bait.

Referring to FIG. 2, FIG. 3, and FIG. 4, the pin support 13 further includes an line attachment mechanism comprising a stopper 20 on the leader 30. This mechanism is structured to adjustably attach the pin support 13 to at least a portion of a leader 30, wherein the leader has one or more hooks attached thereto. The leader 30 may comprise any one of a number of materials including, but not limited to, monofilament, single wire, stranded wire, nylon, or other high strength monofilament lines. In one embodiment, the leader channel the leading end orifice 16 and the trailing end orifice 17 as illustrated in FIG. 2 and FIG. 4. The leading end orifice 16 begins at the front (e.g. left side of figure) of the pin support 13 and leads to the trail end 22. The trail end in the illustration of FIG. 2 is midway within the leader channel 19 although it can be anywhere along the interior of the pin support 13. The trailing end orifice 17 begins at the trail end 22, within the pin support 13, and leads to the back end (e.g., right side of figure)

An advantage of the adjustable quick rig design is that it permits the rig to be attached to any of the various types of leader materials which may have widely varying diameters and strengths. For example, the leader channel 19 can vary in diameter to accommodate leaders of different diameters, such as those of different strengths or gauges. The material of the pin support 13 and the stopper 20 can be selected based on the diameter of the leader channel 19. For example, the pin support 13 can comprise synthetic or metal material to provide strength at the stopping junction. Further, the leader channel 19 allows the pin support 13 to be adjustably positioned along at least a portion of the leader 30. For instance, the stopper 20 can be slid along the leader 30 such that the distance between the stopper 20 and the hook is adjustable. Thus one leader can accommodate a variety of bait fish of different lengths. The adjustable pin rig can allow a user to quickly adjust the length of the leader and the location of the hook relative to the bait.

Referring to FIG. 2, FIG. 3 and FIG. 4, to attach the pin support 13 to a leader 30, a line stopper 20 is crimped to the leader 30 at the desired location or slid up or down the leader to a desired position, thereby establishing the position that the hook 40 will assume longitudinally relative to the bait body 50. The leading end of the leader 30 is then threaded through the pin support leader channel 19, entering at the trailing end orifice 17 and emerging at the leading end orifice 16. The diameter of the stopper 20 is smaller than the diameter of the channel 19 at the trailing end orifice 17, so the leader 30 slides through until the stopper 20 contacts the trailing end 22 of the leading end orifice 16 of the leader channel 19, where it jams, thus holding the pin support 13 in position on the leader 30. Furthermore, the effect of the stopper 20 being jammed against the trailing end 17 of the channel 19 is to transfer the pulling force from the hook 40 to, instead, the pin rig near the anterior end of the bait, thereby enhancing the natural "swimming" motion of the bait by preventing it from spinning.

As illustrated in FIG. 1, the adjustable quick rig for bait includes the pin support 13 which is intended in one embodiment to hold a bait 50 by way of the bait pin 11. The bait pin 11 has a free end 12 structured so as to allow the bait pin 11 to pierce through a portion of the bait 50 and hold the bait firmly. An upper surface 14 of the pin support 13 comprises an open-topped channel contoured to conform to a ventral surface of the bait 50, when rigged proximal to the bait. The contour of the upper surface can keep the gills of a bait fish closed during movement. The contour also provides a larger surface area for being in contact with the bait, thereby providing more frictional forces to keeping the bait 50 securely attached to the pin support 13. The contour may also comprise a rough material for such purposes.

As illustrated in FIG. 2, in further detail, the pin support 13 includes the leader channel 19 which approximately traverses a width of the pin support 13. The leader channel 19 comprises the leading end orifice 16 (e.g. a small diameter passage) and the trailing end orifice 17 (e.g. a larger diameter passage). The trailing end 22, as shown, is internal and midway between the leader channel 19. The trailing end 22 creates the stopping junction and causes a jamming of the line stopper 20 internal to the pin support 13.

As shown in the embodiment of FIG. 2A, the angled tapered passage 19 includes the leading end passage 19A, the trailing end passage 19C, and the angled stopping junction 19B. As shown, the leading end passage 19A is straight and downward angled to the trailing end passage 19C which is straight.

The trailing end orifice 17 traverses a posterior portion of the pin support 13 to receive the leader 30. The leading end orifice 16 connects to the trailing end orifice 17 to pass the leader 30 through the leader channel 19. The pin support 13 is adjustably positioned along at least a portion of the leader 30 by way of the line stopper 20. Although the leader channel 19 is shown internal to the pin support 13, the lead channel 19 can be grooved along the outside surface of the pin support 13 in another embodiment.

The leading end orifice 16 traverses an anterior portion of the pin support 13 and adjoins to the trailing end orifice 17 at the trail end 22 to pass the leader 30. The leading end orifice 16 permits the leader 30 to pass, but prevents the line stopper 20 that is crimped to the leader 30 from passing completely through the leading end orifice 16 of the pin support 13. Accordingly, the line stopper 20 when crimped to the leader 30 and fed through the leader channel 10 jams against the trail end 22 of the leader passage 23.

The line stopper 20 can be crimped to the leader 30 at a desired location on the leader 30 to establish a position that a hook 40 attached to an end of the leader 30 assumes relative to the bait 50. As an example, a user can slide the pin support 13 along the leader 30. The user can crimp the line stopper 20 onto the leader 30 at a desired leader length. The line stopper 20 is then received into the leader channel 19 and jams against the trail end 22.

When the leading end of the leader 30 is slid through the leader channel 19 entering at the trailing end orifice 17 and emerging at the leading end orifice 16, the line stopper 20 contacts and jams against the stopper junction at the trail end 22 internal to the pin support 13. This transfers a pulling force from the hook 40 at a posterior end of the bait 50, instead, to the anterior portion of the pin support 13 corresponding to an anterior end of the bait 50 to suppress a spinning motion of the bait 50 during trolling. That is, the stopping junction transfers a pulling force from the hook 50 to the pin support 13 to suppress a spinning motion of the bait 50 when moving through water.

As shown in FIG. 1 and FIG. 2, the diameter of the channel 19 and trailing end orifice 17 are greater than the diameter of the stopper 20, but the leading end orifice 16 or channel 19, at some point, is of smaller diameter than the stopper 20, so the stopper 20 jams once in contact with it, thereby holding the pin support 13 in place on the leader 30. The line stopper 20 when crimped to the leader 30 is of greater diameter than the leading end orifice 16. The line stopper 20 can be positioned at various locations on the leader 30 to adjust a length of the leader between the pin support 13 and the hook 40 to accommodate a variety of bait of different sizes and lengths. This allows a user to gear up (e.g. increase pin support 13 size/weight, increase leader strength/length) and gear down (e.g. decrease pin support 13 size/weight, decrease leader strength/length). Alternatively, the adjustable quick rig 13 can use only high strength leaders to accommodate bait of different sizes and weights, since the leader 30 length to the hook 40 is adjustable.

In another embodiment, as shown in FIG. 2A, the leader channel 19 can be tapered such that when the line stopper 20 passes internal to the pin support 13, the tapering effect of the leader channel 19 exerts pressure onto the line stopper 20 of the leader 30 during passage through the leader channel 19. A uniform tapering, such as a conical shaping, can exert uniform pressure on all sides of the line stopper 20 thereby further compressing and forming the line stopper 20 onto the leader 30. For example, instead of requiring a user to manually crimp with force the line stopper 20 onto the leader 30, the user can sufficiently crimp the line stopper 20 onto the leader 30, and allow the leader channel 19 to introduce a compressing force onto the line stopper 20 to further crimp the line stopper 20 to the leader 30 during passage of the leader 30 and line stopper 20 through the leader channel 19.

In this embodiment, the adjustable quick rig includes at least one bait pin 11 having a free end 12 intended to pierce through a portion of the bait 50 and hold the bait 50 to the adjustable quick rig, the leader channel 19 having a tapered passage for receiving the leader 30, and the line stopper 20 intended for crimping onto the leader 30 at an adjustable location to permit a desired length of the leader 30 relative to the hook 40 intended for attachment to an end of the leader 30, such that that when the line stopper is crimped to the leader 30, the line stopper 20 jams within a portion of the tapered passage to provide the desired length to accommodate a length of the bait 50. A size of the line stopper can be selected depending on a size and weight of the bait so as to jam at a desired location within the tapered passage and distribute the pulling force at a location within the adjustable quick rig to suppress a spinning motion of the bait during trolling.

Furthermore, the line stopper 20 can have a rough underneath portion exposed to the leader 30 that when placed around the leader line 30, introduces a frictional force to hold the line stopper 20 in place. For example, the line stopper 20 can be manufactured with ridges that when placed in contact with the leader 30 grip the leader line, though without adversely affect the integrity or strength of the line. Moreover, the line stopper 20 may be of a length that is a function of the bait size or weight. For example, as shown in FIG. 3A, the line stopper 20 may be longer in cylindrical length for larger bait sizes, to allow for a greater surface area of the line stopper 20 to be in contact with the leader 30. A larger surface area can distribute the pulling force uniformly across the leader 30 to prevent the line from breaking at a particular point. Accordingly, the line stopper 20 may be of a smaller cylindrical length to accommodate smaller size bait or fish as shown in FIG. 3A.

In one configuration, the line stopper 20 can be partially pre-inserted into the leader channel to receive the leader and provide crimping when the line stopper is further inserted into the leader channel as the leader is passed through both the line stopper 20 and leader channel 19. As an example, a user can feed the line into the line stopper which is already partially inserted into the leader channel. This allows the user to adjust the length of the leader line without separately handling the pin rig 13, the line stopper 20, and the leader 30. Upon determining a desired length, the user can proceed to push the line stopper into the leader channel 19 at the desired location to begin the crimping process. The user can then pull the line to more securely crimp the leader within the leader channel 19.

As noted previously, the line stopper 20 can have a varying cylindrical length dimension. This allows for a first portion of the line stopper 20 to be inserted in the leader channel 19, while allowing a second portion of the line stopper 20 to remain outside the pin rig and receive the leader 30. When the user selects a desired length of the leader, the second portion of the line stopper 20 can be fully inserted to begin the crimping process.

Upon crimping the line stopper 20 to the leader 30 within the leader channel 19 the adjustable quick rig can transfer a pulling force from a back of the bait 50 to a front of the bait 50 during trolling or a catch. The adjustable quick rig with the tapered passage can similarly include a hole and one or more wrap grooves for receiving a wire-wrap, wherein a first end of the wire-wrap is inserted in the hole to securely hold the first end of the wire-wrap in place while the wire-wrap is wrapped around the one or more wrap grooves.

Notably, the adjustable quick rig advantageously allows baits of different sizes and lengths. For example, the length of the leader 30 can be adjusted between the posterior (back end) of the pin support 13 and the hook 40 by setting the line stopper 20 at a desired location. This allows the same leader 30 and hook 40 to be used to bait different sized fish. The combination of the leader passage, leader channel 19 and line stopper 20 as applied to an adjustable location on the leader, transfers the pulling force from the posterior end of the pin support 13 to the anterior end of the pin support 13.

The adjustable quick rig includes at least on hole 28 for a wire wrap 18 through which a first end of the wire or line is inserted to securely hold the first end of the wire or line in place while the wire or line is wrapped around the wrap grooves. The at least one hole 28 is provided to produce a more seamless wire wrap design. More specifically, a first end of the wire wrap 18 is inserted into the hole 28 to establish a base reference point. The first end is not exposed, and the rest of the wire wraps around the pin support and bait. The second end is tied off apart from the first end by inserting in another hole or between the pin support and bait. This can be preferable to twisting two ends of the wire wrap together to form a twisted pair that protrudes from the pin support. The twisted pair arrangement can become exposed and can impart a spinning motion on the bait, since water rushes against the twisted pair. By introducing a first end hole as a base reference, a more streamlined design for accommodating wire wrapping of an underwater pin rig is provided.

Alternatively, as in FIG. 3, and FIG. 4, the leader channel 19 diameter of the trailing end orifice 17 may be configured with a smaller diameter than the diameter of the line stopper 20. In this configuration, the stopper 20 does not enter the leader channel 19, thereby placing the pulling force at the posterior end of the pin support 13.

Thus, referring to FIG. 1, FIG. 1a, FIG. 2, FIG. 3, FIG. 4, FIG. 5, FIG. 6, FIG. 7, and FIG. 8, the present invention further comprises a method for adjustably rigging a bait. The method comprises inserting at least one hook 40 which is attached to a length of leader 30 into a portion of the bait 50. Depending on the habits of the target species of fish, the portion of the bait 50 chosen may be either in the front/center of the bait 50, as illustrated in FIG. 5 and FIG. 7, or in the rear of the bait 50, as illustrated in FIG. 6 and FIG. 8. In a preferred embodiment, the leader 30 is positioned along the inside and adjacent to the front of the bait 50, as illustrated in FIG. 5, FIG. 6, FIG. 7 and FIG. 8 by perspicaciously selecting a position at which the line stopper 20 is crimped on the leader 30 as in FIG. 2 or by sliding said line stopper to said perspicaciously selected position.

In addition, the natural "swimming" action of the bait may be varied by comprising the pin support 13 of materials of various weights, lighter weights tending to cause the bait to skim along the surface, intermediate weights tending to cause the bait to successively breach the surface and dive below it, and heavier weights tending to cause the bait to run below the surface.

In at least one embodiment, the method employs a plurality of pins 11 connected to the pin support 13. Referring to FIG. 8 in another preferred embodiment, the bait 50 is pierced by the free end of the pin 12 from the underside through the top and adjacent the front of the bait 50. The method further includes securing a pin fastener 15 to the free end of the pin 12. In at least one embodiment, the method may include removing or clipping off a portion of the pin 11 which extends through and beyond the bait 50. This renders the rig unobtrusive to the target fish, and less likely to cause the fish to disgorge the bait 50 after a strike due of contact with the pin tip 12. For the same reason, another embodiment comprises leading the free end 12 back and burying in the body of the bait 50 as in FIG. 6.

In a further embodiment, as in FIG. 7, the bait 50 and rig may be wound together in a wire or line wrap 18 to more firmly secure the pin rig to the bait 50. In said embodiment, the pin support 13 may comprise one or more grooves 24 and/or one or more holes 28 to receive said wire wrap 18. Furthermore, the wire or line wrap may be inserted through the bait by various means well known to those skilled in the art of bait rigging.

The method further includes attaching the pin support 13 to a portion of the leader 30, adjacent the front and along the inside (generally anterior ventral side) of the bait 50. Attaching the pin support 13 in this manner serves to direct the trolling force to the front of the bait 50, more specifically, to the pin 11, which substantially aids in imparting a natural "swimming" motion to the bait 50.

Since many modifications, variations, and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An adjustable quick rig for bait comprising:
   a pin support comprising a material heavier than water that is externally rigged to an anterior ventral surface of the bait; and
   a bait pin attached to said pin support, said bait pin having a free end structured so as to allow it to pierce through and wrap around a portion of the bait for securing the external rigging and holding the bait proximal to the pin support,
   wherein a top surface of said pin support comprises an open-topped channel to conform to the anterior ventral surface of said bait, when rigged external and proximal to said bait,
   said pin support is not hooded for enclosing a head of the bait since the pin support is externally rigged to a front underside of the bait to show the bait head;
   said pin support also comprising an angled leader channel internal to the pin support; the angled leader channel comprising;
      a trailing end passage having a large diameter traversing an anterior portion of the pin support to receive a leader with a line stopper, and
      a leading end passage having a small diameter traversing a posterior portion of the pin support and that is downward angled to the trailing end passage to pass the leader but stop the line stopper, wherein the trailing end passage connects to the leading end passage to create an angled stopping junction in the angled leader channel near the anterior of the pin support due to a difference in size of the trailing end passage and the leading end passage, the downward angle of the leading end passage, and a weight and size of the pin support, and, wherein the line stopper when crimped to the leader at an adjustable length along the leader jams against the angled stopping junction in the angled leader channel to establish a location of a hook attached to an end of the leader.

2. The adjustable quick rig of claim 1, wherein upon a leading end of the leader is slid through the leader channel entering at a trailing end orifice of the trailing end passage and emerging at a leading end orifice of the leading end passage, the line stopper contacts and jams against the angled stopping junction thereby transferring a pulling force up from the hook at a posterior end of the bait to an anterior portion of the pin support to suppress a spinning motion of the bait during trolling.

3. The adjustable quick rig of claim 1, wherein the line stopper when crimped to the leader is of greater diameter than at least one part of the leading end passage, and wherein a positioning of the line stopper at various locations on the leader adjusts a length of the leader between the pin support and the hook to accommodate a variety of bait of different sizes and lengths.

4. The adjustable quick rig of claim 1, wherein the top surface of the pin support comprises an elongated concavity such that it, when fitted to a bait fish, extends up and partially over the gills, thus essentially holding the gills closed.

5. The adjustable quick rig of claim 1, wherein said pin holder comprises a synthetic material or a metallic material to accommodate varying strengths and sizes of the line stopper and the leader.

6. An adjustable quick rig for a bait comprising:
a pin support comprising a material heavier than water that is externally rigged to a front underneath surface of the bait to show the bait's head, said pin support is not hooded hiding the bait's head;
at least one bait pin having a free end intended to pierce through and wrap around a portion of the bait head and hold the bait proximal to the pin support; and
an angled leader channel internal to the pin support;
wherein said angled leader channel comprises;
a straight trailing end tapered passage traversing an anterior portion of the pin support to receive the leader and having a trailing end orifice near the underneath surface of the bait;
a straight leading end passage traversing a posterior portion of the pin support and that is downward angled to the trailing end tapered passage and having a leading end orifice near a front surface of the bait;
wherein the straight trailing end tapered passage connects to the straight leading end passage to create an angled stopping junction in the angled leader channel due to the downward angle of the straight leading end passage with respect to the leading end orifice and the trailing end orifice;
wherein a line stopper configured to crimp onto the angled leader at an adjustable location sets a desired length of the leader relative to a hook intended for attachment to an end of the leader, such that when the line stopper is crimped to the leader, and the line is inserted in the leader channel with the hook in the bait and the bait held down by the at least one bait pin, the line stopper jams at the angled stopping junction or within a portion of the straight trailing end tapered passage based on a weight and a size of the pin support to provide the desired length and transfer a pulling force from the hook at a posterior end to an anterior portion of the pin support to suppress a spinning motion of the bait during trolling.

7. The adjustable quick rig of claim 6, wherein a size of the line stopper is selected depending on a size and weight of the bait so as to jam at a desired location within the straight trailing end tapered passage and distribute the pulling force at a location within the adjustable quick rig to suppress a spinning motion of the bait during trolling.

8. The adjustable quick rig of claim 6, wherein the line stopper is partially pre-inserted into the leader channel to receive the leader and provide crimping when the line stopper is further inserted into the leader channel as the leader is passed through both the line stopper and leader channel.

9. The adjustable quick rig of claim 6, wherein the adjustable quick rig uses one leader to accommodate a variety of bait fish of different lengths.

10. The adjustable quick rig of claim 6 transfers a pulling force from a back of the bait to a front of the bait.

* * * * *